United States Patent Office 3,433,399
Patented Mar. 18, 1969

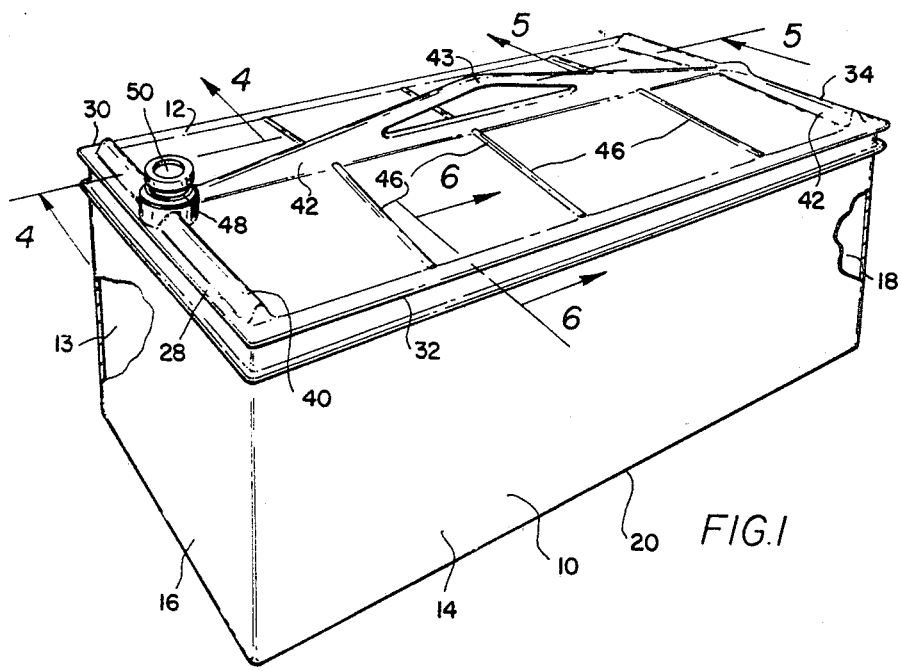
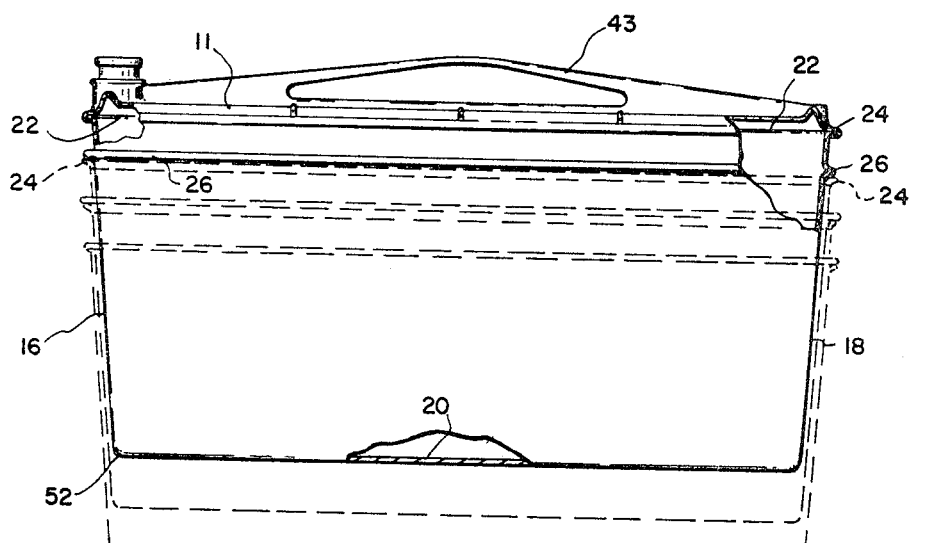

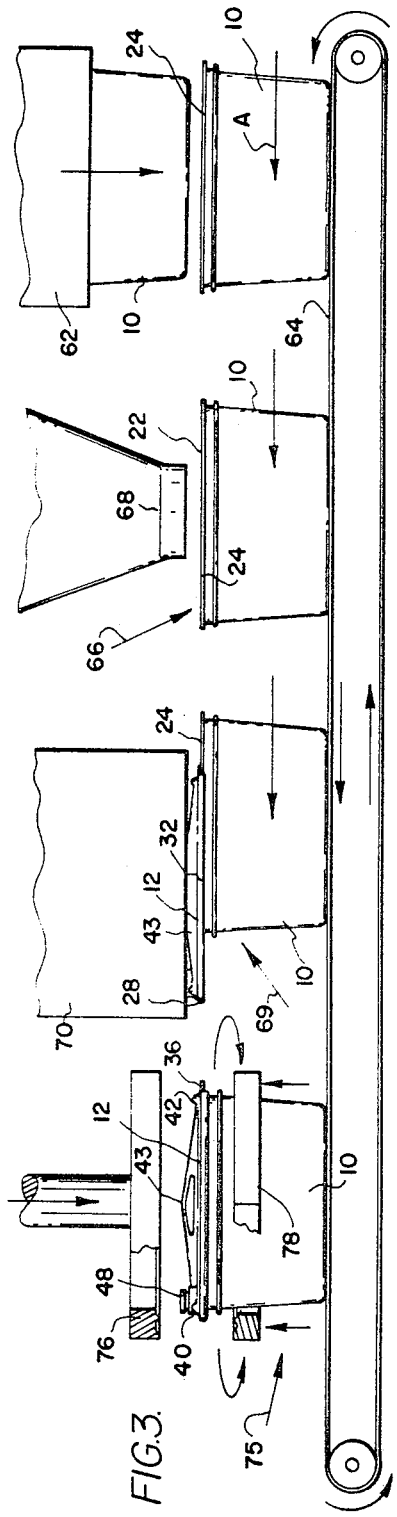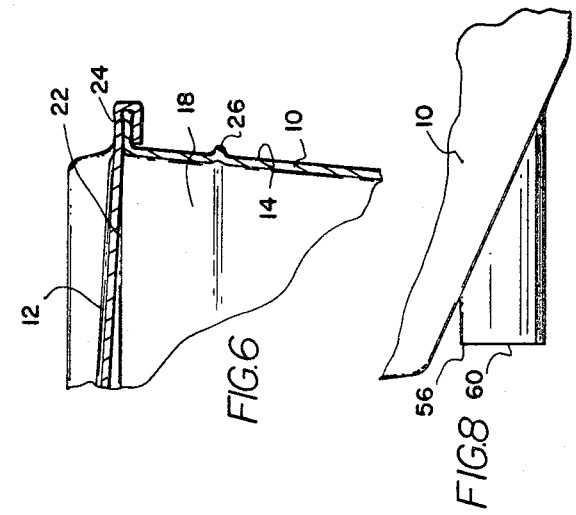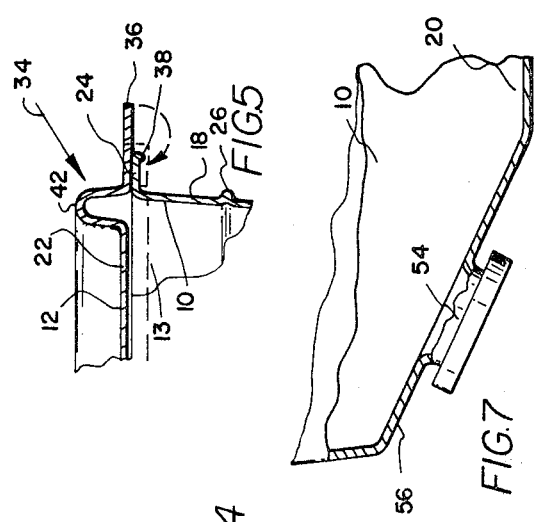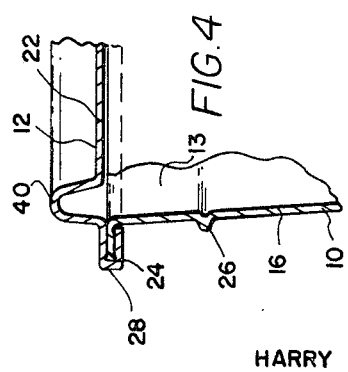
INVENTOR.
HARRY J. GUNNINK
BY
Wm. H. Dean

3,433,399
CONTAINER
Harry J. Gunnink, 12643 N. 30th Drive,
Phoenix, Ariz. 85029
Filed Nov. 14, 1966, Ser. No. 599,660
U.S. Cl. 229—5.6
Int. Cl. B65d 3/10, 43/12, 25/28
5 Claims

ABSTRACT OF THE DISCLOSURE

A container and cover comprising a container having outwardly extending peripheral flange portions and being generally rectangular; the flange portions being at the upper open area of the container and the cover having conforming channel portions which are slidable onto the flange of the container at three sides and fit over and below the flanges of the container, and an outwardly extending flange on the fourth side of the cover adapted to fit over a conforming or respective flange of the container, and to be heat sealed in connection therewith.

---

This invention relates to a container and a method of filling and enclosing the same, and more particularly, to a container and method which is particularly adapted for packaging various products, and particularly liquid products, such as milk or the like.

In volume production and packaging of various foodstuffs, such as milk or the like, has been a problem to provide automatic filling and closure of bulk containers, and particularly those used for containing milk, or the like, wherein two to five gallons, as for example, may be packaged.

It is known that assembly line production of various package structures has been accomplished in the food industry, however, problems have existed in the efficient packaging of milk or the like, in bulk containers ranging from two to five gallons capacity.

Accordingly, it is an object of the present invention to provide a container and method of filling and closing the same, which provides for automatic assembly line filling and enclosing of bulk amounts of milk to thereby provide efficient low cost operations, as well as hermetic sealing of milk or other food products in bulk containers.

Another object of the invention is to provide a novel container, particularly adapted for assembly line filling and enclosing relative to the bulk packaging of various food products, such as milk or the like.

Another object of the invention is to provide a novel container, particularly adapted for hermetic heat sealing, wherein the upper edge of the container is provided with an outwardly directed flange and the cover of the container is provided with inwardly directed channel structure adapted to be slidably fitted relative to the flange of the container, such that the flange of the container may be slidably moved into the channel structure of the cover by holding the cover in a dispenser and moving a filled container at such a level on the conveyor, that the flanges of the container will slide into the channel structure of the cover.

Another object of the invention is to provide a novel container and cover structure, which is particularly adapted for hermetic heat sealing of bulk containers for milk or the like.

Another object of the invention is to provide a novel container having novel construction particularly adapted to be produced of heat sealable material and to be economically produced and of a disposable nature.

Another object of the invention is to provide a novel container having novel means for nesting the same in stacks above a conveyor and a novel cover adapted slidably to fit on outwardly directed flanges at the upper portion of the container, such that the container and the cover may be dispensed above a conveyor and successively assembled in sequence with the filling operation of the container, and the final sealing operation to hermetically seal the cover to the body of the container.

Another object of the invention is to provide a very novel, efficient and desirable method for production line filling, assembly, and hermetically sealing of bulk food containers, such as those desirable for use in containing milk.

Other objects and advantages of the invention may be apparent from the following specification, appended claims, and accompanying drawings, in which:

FIG. 1 is a perspective view of the container in accordance with the present invention;

FIG. 2 is a side elevational view of a container in accordance with the invention, showing portions thereof broken away and in section to amplify the illustration, and further showing a nesting relationship of additional similar containers by broken lines;

FIG. 3 is a side elevational view of a production line assembly conveyor, and means for dispensing containers of the invention thereon, also for filling said containers with milk or other material, and for placing covers on the body portions of the containers and for heat sealing the covers on the containers, and further showing portions of the heat sealing means broken away and in section to amplify the illustration;

FIG. 4 is an enlarged fragmentary sectional view taken from the line 4—4 of FIG. 1;

FIG. 5 is an enlarged fragmentary sectional view taken from the line 5—5 of FIG. 1;

FIG. 6 is an enlarged fragmentary sectional view taken from the line 6—6 of FIG. 1;

FIG. 7 is an enlarged fragmentary sectional view showing a modification of one lower corner of the container of the invention comprising a pouring outlet structure; and FIG. 8 is a fragmentary elevational view showing a further modification of a lower corner portion of the container of the invention, illustrating a further modified form of the outlet or pouring structure of the container.

As shown in FIG. 1, the container of the invention comprises a generally box-shaped body 10 and a cover 12. The body 10 is provided with a pair of sides 13 and 14 and a pair of ends 16 and 18. The sides 13 and 14 and the ends 16 and 18 are integral with a bottom 20 forming a substantially rectangular box-shaped structure having an open upper portion 22.

It will be seen that the ends 16 and 18 diverge upwardly with relationship to each other from the bottom 20 and that the sides 13 and 14 diverge upwardly from each other from the bottom 20.

It will be understood, that the upwardly diverging sides and ends of the container may all be termed as sides in the event the container is made in various rectangular shapes.

The upper open portion of the container, generally indicated at 22, and as shown in FIGS. 2, 4, 5 and 6, is provided with an outwardly directed flange 24 which surrounds the periphery of the container at the upper open portion. This flange 24 extends substantially beyond the outer side wall extremities of the container body 10, and disposed in spaced relation below the flange 24 is a projecting ledge portion 26 adapted to provide a nesting abutment for each container bearing upon the respective flange portion of the next outermost container in a nested group of containers, as indicated by broken lines in FIG. 2 of the drawings.

The container cover 12 is disposed to enclose the upper open portion 22 of the container body 10. This cover 12 is provided with channel portions 28, 30 and 32 adapted to engage the flange 24 outwardly of respective sides 16, 13 and 14 of the container body 10. The channel portions 28, 30 and 32 are open inwardly and are adapted to be slidably positioned over the flange 24, as will be hereinafter described.

The cover 12 on its one end, designated 34 in FIGS. 1 and 5, is provided with an extending flange 36, which is adapted to be closely adjacent the flange 24 and to overlie this flange, such that there are inwardly directed channels on three edge portions of the cover 12, which engage three respective flange portions of the flange 24, permitting the cover to be slid onto the flange 24 from one direction, as will be hereinafter described.

The flange portion 36 of the cover 12, at the end 34 thereof, is adapted as indicated by broken lines 38, to be folded downwardly and under the flange 24 to provide a fourth channel portion of the cover 12, this being done by heat sealing means, as will be hereinafter described.

The container body 10 and cover 12 are preferably made of plastic material, such as heat sealable plastic material capable of being deformed and fused by hot dies, or the like, as will be hereinafter described.

As shown in FIGS. 4 and 5 of the drawings, the cover 12 is provided with pair of inverted channel-shaped in cross-section reinforcing portions 40 and 42 which are open downwardly toward the open upper end 22 of the container body 10. These reinforcing channels extend across the ends of the cover and are integral with opposite ends of an upstanding handle structure 43 provided with an elongated hand hold opening 44 therein. This handle 43 is generally arc-shaped and high in the middle portion and tapering downward to the proximity of the reinforcing channel-shaped structures 40 and 42 at opposite ends of the container cover.

Transverse reinforcing ribs 46 are disposed in the cover 12, these may be channel-shaped in cross-section and are transversely disposed relative to the handle 42 and intersect the same so that the cover is additionally reinforced.

It will be seen from FIG. 6 of the drawings, that the cover 12 is provided with a structure which is upwardly inclined from each end toward the middle, as indicated in FIG. 6, to provide for additional angular bracing of the cover 12, so as to permit the entire container to be picked up by the handle 43 and ultimately be handled in such a manner, that liquid may be poured from a nozzle structure 48, which is a generally hollow cylindrical structure integral with the cover 12, and provided with a cap 50 capable of being removed for the pouring of materials from the container or to permit the installation of a pouring spout, as may be desired.

In some instances, it may be desirable to provide a pouring nozzle at 52, shown in FIG. 2 of the drawings. This lower corner 52 of the container body 18 is shown in modified form in FIGS. 7 and 8. The modification, shown in FIG. 7, comprises a pouring nozzle and cap structure 54 disposed on an inclined portion 56 near the bottom corner of the container so as to clear the level of a floor or shelf 58 on which the bottom 20 of the container body 18 may be located. The nozzle and cap structure 54 is provided for connection of a suitable pouring spout or tube, as shown in the modification FIG. 8. This structure is similar to that shown in FIG. 7, but includes a tubular extension 60 to which a conventional tube may be connected for the purpose of supplying liquid in conventional vending machines, or the like.

The structure of the invention, as related to production line dispensing, filling and sealing of the containers of the invention is disclosed in FIG. 3. The method of the invention, includes the steps of forming the container, so as to carry out further method steps of assembling the cover, as well as dispensing the containers onto a conveyor, and finally the filling, placement of the covers, and the heat sealing thereof hermetically, all as indicated in FIG. 3 of the drawings.

The container bodies 10 are nested, as indicated by broken lines in FIG. 2, and as hereinafter described. In this nested condition, the container bodies 10 are maintained in a vertical chute or dispenser, designated 62 in FIG. 3 of the drawings. This dispenser 62 is positioned directly over an endless or other suitable conveyor 64 for intermittently dispensing the container bodies 10 onto the conveyor in upright position, later to be carried by the conveyor and transported thereon in the direction of the arrow A in FIG. 3 of the drawings.

The container bodies 10, are thus dispensed from the dispenser 62 and moved to a second station, designated generally 66, the conveyor 64 being moved to position a container body 10 beneath the liquid dispenser 68, which dispenses liquid into the container body 10, substantially filling it, whereupon the container body 10 is moved to the next station 69 by operation of the conveyor 64. In this station 69, the flange structure 24 at the upper open portion of the container slides into the channel portions 28, 30 and 32 of a container cover 12, which is held in a cover dispenser 70, which moves each respective cover 12 downward to a position at which the respective flange 74 of a container body 10 will slide into said channel portions 28, 30 and 32 of the cover 12. When the container body 10 has progressed a sufficient distance, the cover 12 is slid completely onto the flange structure 74, which thus places the cover of the container on a production line assembly basis.

The conveyor 64 is then operated to position the respective container body 10 and its connected cover 12 in a station location 75. In this location, the flange portion 36 of the cover 12 and the flange 24 of the body 10 are intimately disposed relative to each other, and heated heat sealing dies 76 and 78 are brought to bear above and below the assembled channels and flanges of the cover and the body, respectively, to fuse and heat seal hermetically the entire flange and channel assembly around the perimeter of the cover 12 and the upper open end 22 of the container body 10.

The die structure 78 is a multi-piece separable die which is moved outwardly and above the container between conveyor movements to allow each successive container to be positioned below the die 76 so that the dies may be moved vertically, one die downwardly and the other upwardly to engage and heat seal the channel and flange structures of the cover and the container body, respectively.

During this operation, the flange 36 of the cover is folded downwardly, as indicated by broken lines in FIG. 5 of the drawings, by the upper die 76 and is then heat sealed in position, as shown in FIG. 5 of the drawings. The detail of the dies is no part of the present invention.

It will be obvious to those skilled in the art that various modifications of the invention may be resorted to in a manner limited only by a just interpretation of the following claims.

I claim:

1. In a container, the combination of: a box-like body having a bottom and four upstanding sides, said body having an open top, said body having a peripheral upper edge structure at the upper portions of said sides; said upper edge structure having an outwardly directed flange portion projecting generally beyond the outer surfaces of said sides; and a cover having a peripheral edge structure, said peripheral edge structure of said cover provided with three channel portions disposed generally to align with three respective sides of said body, said channel portions having open portions directed inwardly and adapted to receive said peripheral flange of said body, said peripheral edge structure of said cover having an outwardly directed flat cover flange portion adjacent the remaining one of said four sides of said body, said cover flange closely adjacent to and overlying said outwardly directed flange of said container, two of said channel portions at opposite edges of said cover open below said cover flange and adapted to slide onto said flanges of said body; said body and said cover are of heat fusible and sealable material; and said flange portion of said cover being formable into a channel shape over and under said flange of said container.

2. The invention, as defined in claim 1, wherein: said channel portions and said cover flange portion are sealingly fusable to said outwardly directed flange of said body.

3. In a container, the combination of: a box-like body having a bottom and four upstanding sides, said body having an open top, said body having a peripheral upper edge structure at the upper portions of said sides; said upper edge structure having an outwardly directed flange portion projecting generally beyond the outer surfaces of said sides; and a cover having a peripheral edge structure, said peripheral edge structure of said cover provided with three channel portions disposed generally to align with three respective sides of said body, said channel portions having open portions directed inwardly and adapted to receive said peripheral flange of said body, said peripheral edge structure of said cover having an outwardly directed flat cover flange portion adjacent the remaining one of said four sides of said body, said cover flange closely adjacent to and overlying said outwardly directed flange of said container; two of said channel portions at opposite edges of said cover open below said cover flange and adapted to slide along onto said flange of said body; said cover flange portion is adapted to be formed into a channel-shaped structure around and under the outer edge of said outwardly directed flange of said body.

4. In a container, the combination of: a box-like body having a bottom and four upstanding sides, said body having an open top, said body having a peripheral upper edge structure at the upper portions of said sides; said upper edge structure having an outwardly directed flange portion projecting generally beyond the outer surfaces of said sides; and a cover having a peripheral edge structure, said peripheral edge structure of said cover provided with three channel portions disposed generally to align with three respective sides of said body, said channel portions having open portions directed inwardly and adapted to receive said peripheral flange of said body, said peripheral edge structure of said cover having an outwardly directed flat cover flange portion adjacent the remaining one of said four sides of said body, said cover flange closely adjacent to and overlying said outwardly directed flange of said container; two of said channel portions at opposite edges of said cover open below said cover flange and adapted to slide along onto said flange of said body; said cover is provided with a nozzle communicating with the interior of said container, and adapted to serve for pouring materials from said container.

5. In a container, the combination of: a box-like body having a bottom and four upstanding sides, said body having an open top, said body having a peripheral upper edge structure at the upper portions of said sides; said upper edge structure having an outwardly directed flange portion projecting generally beyond the outer surfaces of said sides; and a cover having a peripheral edge structure, said peripheral edge structure of said cover provided with three channel portions disposed generally to align with three respective sides of said body, said channel portions having open portions directed inwardly and adapted to receive said peripheral flange of said body, said peripheral edge structure of said cover having an outwardly directed flat cover flange portion adjacent the remaining one of said four sides of said body, said cover flange closely adjacent to and overlying said outwardly directed flange of said body; two of said channel portions at opposite edges of said cover open below said cover flange and adapted to slide along onto said flange of said body; said cover is provided with a handle structure integral therewith, said handle structure being elongated and extending upwardly from said cover, said handle generally arched upwardly at its middle portion; said cover having integral reinforcing ribs disposed transversely to and integral with said handle structure.

References Cited
UNITED STATES PATENTS

| 162,314 | 4/1875 | Schmidt | 215—10 |
| 693,056 | 2/1902 | Oakman. | |
| 1,232,113 | 7/1917 | Soren | 220—41 |
| 2,099,055 | 11/1937 | Ferngren. | |
| 2,289,747 | 7/1942 | Baker. | |
| 2,641,374 | 6/1953 | Der Yuen | 215—10 |
| 3,142,422 | 7/1964 | Mojonnier | 150—.5 X |
| 3,195,752 | 7/1965 | Cox | 220—94 X |
| 3,215,300 | 11/1965 | Lynch | 215—10 X |

FOREIGN PATENTS 1,345,110  10/1963  France.

DONALD F. NORTON, *Primary Assistant.*

U.S. Cl. X.R.

220—41, 94; 222—465